April 22, 1947.  B. E. SHAW  2,419,376
THERMOSTATIC CONTROL FOR REFRIGERATION SYSTEMS
Filed June 9, 1941
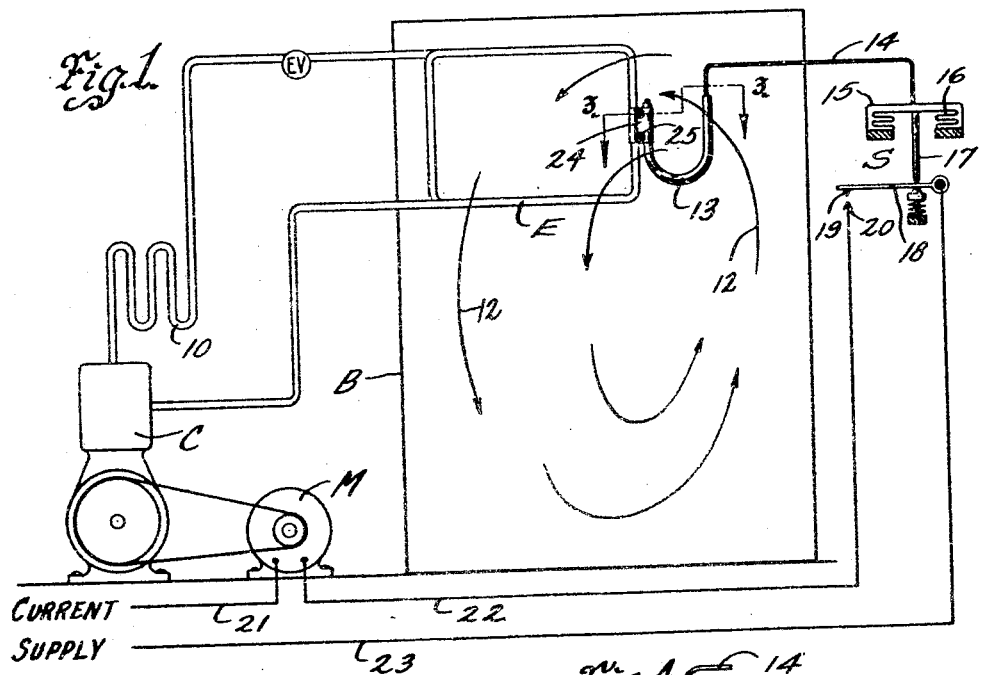
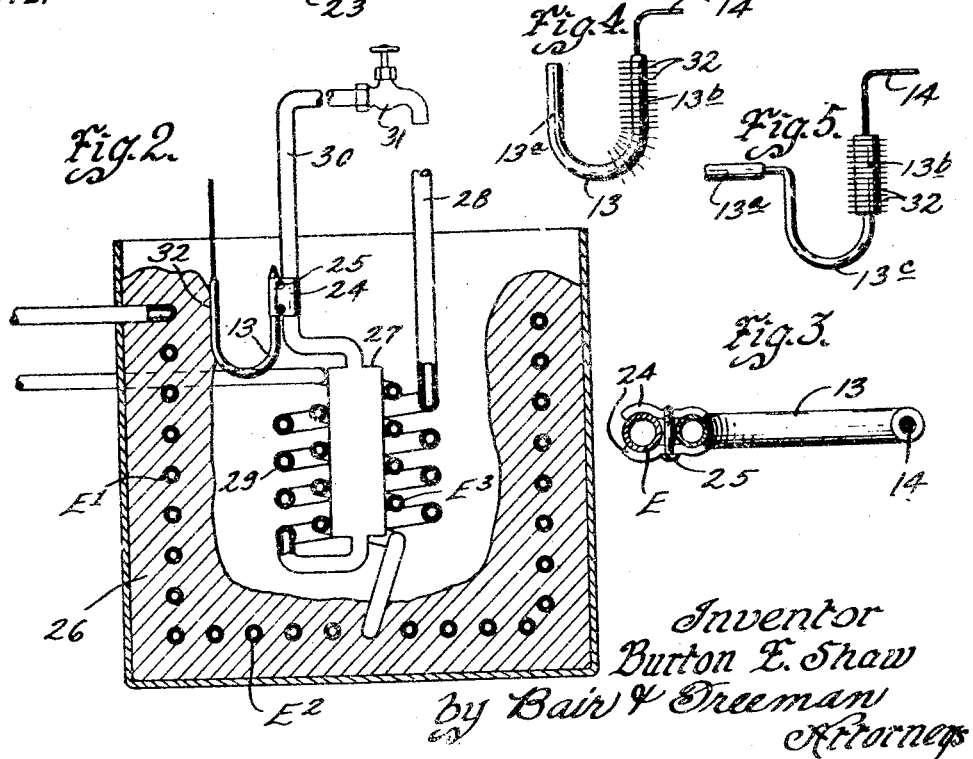
Inventor
Burton E. Shaw
by Bair & Freeman
Attorneys Patented Apr. 22, 1947

2,419,376

UNITED STATES PATENT OFFICE 2,419,376

THERMOSTATIC CONTROL FOR REFRIGERATION SYSTEMS

Burton E. Shaw, Bristol, Ind., assignor to Penn Electric Switch Co., Goshen, Ind., a corporation of Iowa Application June 9, 1941, Serial No. 397,273

7 Claims. (Cl. 62—4)

My present invention relates to a control for a refrigeration system, said control including a power element arrangement for a control device for the system wherein a bellows or the like is responsive to the average pressure in a capillary bulb having different parts thereof responsive to the tempertaure of different elements.

One object of my invention is to provide a control for a refrigeration system which is inexpensive to manufacture and which has a capillary and bulb that can be made in the form of a single unit to take the place of two or more units as now used in temperature controlling installations wherein one unit is responsive to the temperature condition of one element and another unit is responsive to the temperature of another element.

Another object is to provide a capillary and bulb system which consists merely of an elongated bulb, a capillary tube extending from one end thereof, and a control device controlled by pressure from the tube, the bulb being arranged to have one portion thereof responsive as by thermal conduction to the temperature of an evaporator coil or other element chilled by refrigerant, and its remaining portion responsive to the temperature of air chilled by such refrigerant, so that if the temperature of the air in the box is high the control will cut in at a lower coil temperature than normal when the control is responding to the evaporator temperature alone, while if the temperature of the air in the box is low the control will cut in at a higher coil temperature.

Still another object is to provide a capillary bulb design wherein the bulb is dependent on an average of coil temperature and air temperature in the box for operating a control device, with the control cutting out at a lower evaporator temperature as the load in the box increases, whereby the box temperature remains uniform regardless of load.

A further object is to provide a capillary and bulb which may be used in connection with a water cooler or the like to accurately control the formation of an ice bank around an evaporator coil thereof.

Still a further object is to provide a bulb having a plain portion responsive to evaporator temperature and a finned portion of the same bulb responsive to temperature of air in a box chilled by the evaporator.

With these and other objects in view, my invention consists in the construction, arrangement and combination of the various parts of my refrigeration system whereby the objects contemplated are attained, as hereinafter more fully set forth, pointed out in my claims and illustrated in the acompanying drawings, in which:

Figure 1 is a diagrammatic view showing a control for a refrigeration system including a capillary tube and bulb arrangement for controlling the operation of the compressor motor;

Figure 2 is a diagrammatic cross sectional view of a water cooler to which my invention has been applied;

Figure 3 is an enlarged sectional view on the line 3—3 of Figure 1, showing the relationship of certain parts of my capillary and bulb with an evaporator coil.

Figure 4 is a side elevation of a modified form of capillary bulb and in which the portion of the bulb responsive to air temperature is finned for the purpose of facilitating heat transfer between the air in the box and the bulb itself.

Figure 5 is a side elevation of another modified form thereof.

On the accompanying drawing, I have used the reference character M to indicate a motor for a refrigerant compressor C. The compressor C pumps refrigerant through a condenser 10, an expansion valve EV and an evaporator coil E. The coil E is mounted in a box B so that there is air circulation, as indicated by the arrows 12.

My refrigeration system includes a bulb 13, a capillary tube 14, connected with one end thereof, and a control device such as an electric switch, indicated generally at S. The switch S includes a bellows chamber 15 having a bellows 16 therein. The bellows 16 through a rod 17 controls a switch arm 18. Switch contacts are indicated at 19 and 20, and they control the flow of current through wires 21, 22 and 23 to the motor M.

The bulb 13 has its dead end (opposite the capillary tube end), connected in thermal conducting relation to the evaporator E as by clamp plates 24. Clamp screws 25 are illustrated as used to clamp the plates 24 in tight engagement with the surfaces of the evaporator coil and the bulb.

Heretofore, attempts have been made to operate a refrigerant compressor motor control switch as a resultant of two temperatures such as evaporator coil temperature and air temperature within the box. Two bulbs and two capillary tubes have been provided with the tubes both connected to the bellows chamber. Difficulty has always been experienced because the evaporator bulb is coldest, and accordingly the liquid in the bulb and tube system condenses in it. The air bulb is always warmer than the evaporator bulb and accordingly aids in driving the lquid over to the cold bulb due to vaporization in the air bulb. The air bulb accordingly takes on complete control of the control switch. In my installation, on the other hand, the bulb 13 is elongated so that one part of it is responsive through thermal conduction to the temperature of the evaporator coil and the remaining portion is responsive to air temperature. I have found that this system works best with a minor portion responsive to the evaporator coil temperature and the major portion responsive to air temperature. There is no long capillary passageway presenting thermal resistance between the two portions of the bulb responsive to the two different temperatures. Heat is readily conducted through the bulb and through its liquid fill. By making the bulb U-shaped there is a tendency for the liquid fill to settle to the lowest part of the bulb and to stay out of the capillary tube since the bulb is colder than the tube. This eliminates slugs of liquid in the capillary tube and also eliminates erratic action of the control device as a result of such slugs.

In operation the bellows 16 responds to an average pressure in the bulb 13. The tendency in the bulb is for the pressure in the minor portion, clamped to the evaporator coil, to be lower than in the major portion responsive to air temperature. However, as the bulb is comparatively large in diameter, there is a ready equalization of pressure throughout the bulb immediately after any part of it is raised or lowered in temperature. The result is response of the bellows to only an average of the pressures, so that the control device is temperature sensitive to the combination of both the evaporator temperature and the air temperature. There is a tendency for the motor M to be cut in as a result of a rise in air temperature, a rising evaporator coil temperature or both depending on an average pressure developed by such rise. Similarly, the cut out is accomplished by a reduction in evaporator coil temperature, air temperature or both.

My arrangement somewhat shortens the cycles of operation, although these, of course, can be lengthened by the proper differential of operation in the switch system. The control of the switch is more accurately responsive to conditions which cause the refrigeration system to so operate that better humidity conditions as well as defrosting conditions are secured.

The main advantage of my control is its simplicity in automatically adjusting itself to varying conditions. When an additional load is placed in the box and the box temperature increases, the control will cut in when the coil is at a lower temperature in an attempt to cool the box to the desired temperature.

With an increase in load, the cycles are shorter and oftener. As the extra load is cooled, the coil temperature gradually returns to normal and the coils will again completely defrost, each cycle. During the heavy load period, due to the greater number of cycles and the tendency toward a defrost each cycle, the frost would not increase as much on the coil as with the standard types of controls which depend entirely on the temperature of the box or the temperature of the coil or the pressure in the coil, as the case may be. With my capillary bulb, I accomplish in a number of short cycles what must be accomplished with a long cycle using the standard types of controls.

On normal light loads, the unit will not cycle so often but will completely defrost on each cycle. If the load is exceptionally heavy, the coil may not entirely defrost on each cycle but the cycles will be more frequent and frost will not build up on the coils during the heavy load period. As soon as the load has once again been reduced, the coil will again defrost on each cycle.

It must be kept in mind that a control of the type disclosed will operate from the average of the temperatures at the coil end of the bulb and in the portion of the bulb responsive to air temperature. The temperature maintained in the box will vary in accordance with the amount of bulb that is clamped to the coil. As the box temperature approaches the freezing point, the degree of defrosting of the coils increases. My control will cycle a cold compressor if the box is so located, or the load in the box is such, that the temperature of the box can rise when the pressure in the coil is low, due to liquefying of the refrigerant in the compressor. If box temperatures are low and coil temperatures are lower than the average cut-in temperature, the unit cannot cycle. My control gives more uniform box temperature under all load conditions and over a wide variation of ambient temperatures than with standard types of controls. It automatically takes care of seasonal ambient temperature changes.

My capillary and bulb system has the possibility of use in installations other than that of Figure 1. For instance, in Figure 2 a water cooler is illustrated wherein a first evaporator coil E1, a second evaporator coil E2, and a third evaporator coil E3 are connected in series. The coil $E^1$ is a helical coil, starting at the top left side and terminating at the bottom so as to form the outer turn of coil $E^2$ which is a spiral coil. The inner end of the spiral coil $E^2$ then extends upwardly to connect to the bottom of the helical coil $E^3$, the top of which connects with the outlet conduit. The evaporator coils E1 and E2 are adapted to build up an ice bank 26 while the evaporator coil E3 is adapted to operate as a precooler for a cold water chamber 27. An intake water pipe 28 is shown extending to a water coil 29 located in the air space within the water cooler and connected with the chamber 27. An outlet pipe 30 is also connected with the chamber and extends to a faucet 31. The bulb 13 has its dead end connected by the plates 24 and the screws 25 to the water pipe 30 while its free end extends into the air space and to a position where it will eventually be contacted by the ice bank 26, as indicated at 32.

In an installation of this kind the refrigerating cycle is started after a small quantity of water has been withdrawn, even though the ice bank has not melted to any great degree. In my arrangement with the bulb practically full of liquid, the bulb will control the temperature of the ambient wherein it is immersed, even though different portions of the bulb are at different temperatures, by having a part of the bulb responsive through thermal conduction from the pipe 30 and the major portion of the bulb responsive to air temperature and positioned so that the ice bank may eventually contact it. The refrigerant compressor is started soon after the faucet 31 is opened. During the periods of no water use the compressor is cycled whenever the ice bank melts away from the bulb 13, thus insuring that the proper size of ice bank will be maintained.

In Figure 4, I have shown a modified bulb 13 wherein the portion 13ᵃ is adapted to be clamped to the evaporator, while the portion 13ᵇ is provided with heat transfer fins 32. The fins 32 increase the effective heat transfer area of the air temperature responsive portion 13ᵇ of the bulb 13 so as to give quicker and more accurate response of the bulb to variations of temperature in the atmosphere within the box.

Figure 5 shows a similar arrangement wherein the portions 13ᵃ and 13ᵇ are individual chambers connected together by a tube 13ᶜ. The tube 13ᶜ has a bore which is preferably larger than the usual capillary bore to permit ready equalization of pressure in the bulb portions 13ᵃ and 13ᵇ. The portion 13ᵇ is provided with heat transfer fins 32, as in Figure 4, to aid in the absorption and dissipation of heat when the temperature of the bulb portion 13ᵇ is rising or falling in response to changes in air temperature.

Some changes may be made in the construction and arrangement of the parts of my system without departing from the real spirit and purpose of my invention, and it is my intention to cover by my claims any modified forms of structure, or use of mechanical equivalents, which may be reasonably included within their scope.

I claim as my invention:

1. In a refrigeration system including an evaporator coil, the combination of an elongated bulb having a minor portion adjacent its dead end clamped in thermal conducting relation to an evaporator coil, and a major portion responsive to air temperature, said bulb being U-shaped and mounted with the ends of its two legs extending upwardly, a capillary tube extending from the other end of said bulb and a control device responsive to pressure variations in said capillary tube resulting from an average of pressures in said minor and major portions of said bulb.

2. A refrigeration system comprising the combination with an evaporator and a compressor for supplying refrigerant thereto; of an elongated bulb having a minor portion clamped in good thermal conducting relation to the evaporator and thereby supported and a major portion supported by said minor portion and responsive to air temperature, said bulb being U-shaped and mounted with the ends of its two legs extending upwardly, a capillary tube extending from said bulb, and a control device for the compressor, said capillary tube being connected with a pressure responsive portion of said control device whereby the control device is responsive to pressure variations in said minor and major portions of said bulb.

3. A refrigeration system comprising the combination with an evaporator, a compressor for supplying refrigerant thereto and a motor for said compressor; of a capillary having a temperature responsive portion and a pressure transmission portion said temperature responsive portion being U-shaped and mounted with the ends of its two legs extending upwardly, a control device operated by changes of pressure in said transmission portion, said control device being connected with the compressor motor to control the same, said temperature responsive part having a portion thermally related to refrigerant in the evaporator pumped by the compressor and operating to at all times assume substantially the temperature of the refrigerant, and a portion responsive to the temperature of air chilled by such refrigerant and operating to at all times assume substantially the temperature of such air whereby response of said control device is to a resultant of the two temperatures of said two portions of said capillary.

4. A water cooling refrigeration system comprising the combination with an evaporator, a compressor for supplying refrigerant thereto and a water conduit chilled by said evaporator; of a bulb of U-shape having a capillary tube extending from one end thereof, a control device responsive to pressure from said capillary tube, said bulb having its other end secured in thermal conducting relation to the water conduit, the control device controlling the operation of said compressor, said bulb having its remaining portion responsive to water chilled by the evaporator, said remaining portion of said bulb being contactable by ice formed on the evaporator.

5. A refrigeration system comprising the combination with an evaporator, a compressor for supplying refrigerant thereto and a motor for said compressor; of a temperature responsive bulb and a pressure transmission capillary, a control device connected to said bulb by said capillary and operated by temperature changes affecting said temperature responsive bulb and thereby effecting pressure variation in said capillary, said control device being connected with the compressor motor to control the same, said temperature responsive bulb having a minor portion so connected to the evaporator as to assume the temperature thereof, and a major portion responsive to air temperature in an enclosure containing the evaporator said bulb being U-shaped with the ends of its two legs extending upwardly, said last portion being provided with fins to increase the heat transfer area thereof.

6. An arrangement for controlling the operation of a refrigeration system, said arrangement comprising a U-shaped tube, one leg of which has a closed end, heat conducting means for clamping said leg to part of an evaporator in heat exchange relation with such part and with the closed end of said leg at the top thereof and the rest of the tube spaced from the evaporator to be affected by temperature changes in air cooled by said evaporator, a capillary tube, and an electric switch having a fluid-tight chamber, said capillary tube placing said chamber in communication with the interior of the other leg of the U-shaped tube.

7. A thermostatic control for controlling the operation of a refrigeration system comprising a U-shaped tube having one leg closed at its outer end, a metal clamp for connecting said leg to part of an evaporator in heat exchange relation relative thereto with the closed end of said leg uppermost and with the rest of the U-shaped tube spaced from the evaporator to be affected by temperature changes in the air cooled by said evaporator, a capillary tube having one end connected with the outer end of the other leg of said U-shaped tube and communicating with the interior thereof, a control switch for the compressor of the refrigeration system, said control switch having a fluid-tight chamber, and the other end of said capillary tube being connected therewith and communicating with the interior thereof.

BURTON E. SHAW.

REFERENCES CITED

The following references are of record in the file of this patent:

UNITED STATES PATENTS

| Number | Name | Date |
|---|---|---|
| 2,178,200 | Cannon | Oct. 31, 1939 |
| 1,408,744 | Keen | Mar. 7, 1922 |
| 1,605,057 | Nichols | Nov. 2, 1926 |
| 1,821,702 | Freeman | Sept. 1, 1931 |
| 1,919,500 | Carpenter | July 25, 1933 |
| 2,133,967 | Buchanan | Oct. 25, 1938 |
| 1,886,042 | Osborne | Nov. 1, 1932 |
| 2,279,888 | Hobbs | Apr. 14, 1942 |
| 2,303,182 | Tobey | Nov. 24, 1942 |
| 2,196,777 | Otto | Apr. 9, 1940 |
| 1,960,802 | Backstrom et al. | May 29, 1934 |